(12) United States Patent
Strand et al.

(10) Patent No.: US 6,359,799 B2
(45) Date of Patent: Mar. 19, 2002

(54) POWER FACTOR CORRECTOR

(75) Inventors: Timothy Strand, Wiltshire (GB);
Matthew John Littlefair, Eindhoven (NL)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/821,619

(22) Filed: Mar. 29, 2001

(30) Foreign Application Priority Data

Mar. 31, 2000 (GB) ............................................. 0007921

(51) Int. Cl.[7] .............................. H02M 7/12; G05F 5/00
(52) U.S. Cl. ............................. 363/65; 323/299; 363/39
(58) Field of Search ............................. 363/39, 40, 41, 363/43, 44, 65, 67, 68, 69, 70, 71; 315/247, 307; 323/299, 300

(56) References Cited

U.S. PATENT DOCUMENTS

| | | | | |
|---|---|---|---|---|
| 4,680,689 A | * | 7/1987 | Payne et al. ............... 363/44 X |
| 5,003,453 A | * | 3/1991 | Tighe et al. .................. 363/65 |
| 5,731,969 A | * | 3/1998 | Small ....................... 363/65 X |
| 5,889,662 A | * | 3/1999 | Schettler et al. ............. 363/40 |
| 6,034,489 A | * | 3/2000 | Weng ......................... 315/307 |

* cited by examiner

Primary Examiner—Jessica Han
(74) Attorney, Agent, or Firm—Wood, Herron & Evans, L.L.P.

(57) ABSTRACT

A power supply suitable for use with discharge lamps includes at least one power factor corrector module for connection to a three phase input supply. Each module includes three single phase circuits for connection between a respective pair of phases, each circuit comprising a converter. The output of the three single phase circuits are connected in series. The module further includes control for varying the duty cycle of the converters using a respective reference signal synchronized with the input voltage to the corresponding converter, and inversely proportionally to a measured instantaneous input voltage to the corresponding converter. Each reference signal is sinusoidal and the control varies the duty cycle of each of the converters proportionally to the square of the respective sinusoidal reference signal. The current drawn by each converter is sinusoidal, even if the mains contains distortions.

14 Claims, 8 Drawing Sheets

POWER FACTOR CORRECTOR

This application claims the priority of British Patent Application No. 0007921.0 filed Mar. 31, 2000, the disclosure of which is hereby fully incorporated by reference herein.

FIELD OF THE INVENTION

The present invention relates to power factor correction, and more particularly to a power factor corrector for use with a power supply which provides a variable output voltage.

BACKGROUND OF THE INVENTION

It is important to maximise the power factor of a circuit as any imbalance presented to the mains supply by industrial power users is metered by the electricity supply company.

The use of boost power factor correction circuits to address this problem is well known. However, it is not readily possible to reduce the output voltage of such circuits below that of the supply. Also, they can be unreliable as they require the use of electrolytic capacitors which tend to dry out and fail.

In order to minimize the harmonic distortion applied to the input supply, the corrector should aim to draw a current having a sine waveform synchronized with the supply, thereby presenting a balanced load. Furthermore, international regulations require that a power supply meets specific harmonic current limits.

A conventional approach to the problem of power factor correction is a two-stage process. One example of a two-stage process is shown in U.S. Pat. No. 5,003,453, to Tighe et al., in which each of the three phases is stepped up individually using a high power factor correction circuit controlled by feedback to generate a respective DC output voltage, and then each of these DC voltages is converted by a DC/DC converter back down to a desired level. The resultant three DC voltages are then combined in parallel.

Many conversion processes, including many two-stage conversion processes, have a control system which operates on the basis of the peak input voltage value, which is calculated from the rms voltage value. Clearly, this approach gives an incorrect result, however, because the peak measurement can only be obtained by using the result from the previous cycle of mains.

U.S. Pat. No. 5,731,969, to Small, shows an analogue system having three power factor converters for receiving respective phases of the AC signal. The output of each converter is fed to a respective transformer. The transformers are effectively connected in series. For each transformer, a pair of diodes are provided to produce a desired output polarity. A purely analogue arrangement is employed to control the converters. Specifically, the input to each converter is stepped down, regulated, and optionally processed by a phase-locked loop to ensure that the result is a sinewave. The resultant outputs (one per converter) are each multiplied by an error signal, and then input to a respective modulator, which produces a respective pulsed output signal having a proportion of output pulses proportional to its input. The pulsed output signals are used to control respective converters. The error signal is derived from the difference between a reference signal and an output of the series sum of the three converters. This system suffers from a number of disadvantages. Since the control is on the basis of a feedback loop from the output of the sum of the converters, the system will be subject to significant ripple. Also, there is no natural way of limiting the voltage which is applied to the transformers at the outputs of the converters, so that unless the transformers are specified to be tolerant to a wide range of conditions—which increases their size and cost—the proposed system will be unsuitable for high power applications (e.g. delivering an output of several kilowatts). Furthermore, if one of the phases is subject to noise, this effect will be transmitted to the other phases, since the error signal is shared.

U.S. Pat. No. 4,680,689, to Payne et al., proposes a system in which each converter receives a pair of input phases, and after regulation applies it to a respective inductor 24, connected to the center tap of the primary of a respective transformer. A pulse modulator is provided to switch connections to the transformer, to control current flow to be substantially proportional to the instantaneous value of DC input. The outputs of the three transformers are added in parallel. Among the disadvantages of this system are thus that three inductors are required. Also, the system has no mechanism for compensating if the input voltages depart from sinusoids.

SUMMARY OF THE INVENTION

The present invention provides a power factor correction module, and more particularly provides a power supply suitable for use with discharge lamps, which do not require a constant voltage as they initially need to heat up, and instead draw a voltage which typically varies between 40 and 2000V.

According to the invention, a power factor corrector module for connection to a three phase input supply comprises three single phase circuits for connection between a respective pair of phases, each circuit comprising a converter. The outputs of the three single phase circuits are connected in series. The module further includes a control operable to vary the duty cycle of the converters substantially in synchronism with the respective phase of the supply. More particularly, the control varies the duty cycle of each of the converters using a respective reference signal synchronized with the input voltage to the corresponding converter, and inversely proportionally to a measured instantaneous input voltage to the corresponding converter.

Preferably, each reference signal is sinusoidal and the control varies the duty cycle of each of the converters proportionally to the square of the respective sinusoidal reference signal. However, other waveforms can be used if the waveform of the desired input current is not sinusoidal.

Provision of a separate circuit per phase of a three phase supply enables the harmonic current requirements noted above to be met. Each circuit draws a sinusoidal current from the supply, substantially in phase with the supply voltage. This circuit design is relatively rugged, and cost effective to manufacture. If the three phase supply has a neutral, this can be used, but it is not essential.

Since the control is on the basis of instantaneous input voltage, control in the present invention is feed-forward rather than feedback, which significantly reduces the risk of ripple in the output.

Furthermore, the converters do not need to measure and store the peak value of the mains. The duty cycle of the converters may be limited to a maximum value to ensure that the operating requirements of the transformer are not exceeded.

In a preferred embodiment, the control utilizes the zero crossing points of the supply voltage as a reference for the generation of the reference signals.

Various converter configurations have been considered for use in implementing the module. Having regard to factors such as simplicity, reliability, device stress, the implementation of the control, the required output voltage variation, parallel/series connection of modules and EMC requirements, a half bridge forward converter topology is preferred. This configuration has a lower device count than a full bridge topology and produces better utilization of the switching devices of the converter. However, other configurations may be used to suit particular circumstances.

Preferably, the duty cycle of each of the three converters can by modified using a single external control signal, so that the sum of the output of the converters is modified proportionally.

Each single phase circuit may include a transformer, and a bridge rectifier to rectify the output of the transformer. The rectifier minimizes copper losses in the transformer. Preferably, a diode is connected across the rectifier output. Combination of a diode in this way with a bridge rectifier ensures that the secondary winding of the transformer does not carry load current during the off time of the converter. This configuration also overcomes the problem of transformer core saturation due to secondary volt time imbalance, as would be the case for full wave rectification. Furthermore, the output diode improves the circuit efficiency during off times.

As noted above, the outputs of the single phase circuits are connected in series. In a preferred arrangement, the module includes a single output filter connected to the combined output of the three single phase circuits. This has the advantage that the output filter sees only a small change in duty cycle due to the summation of the three switching waveforms.

The present invention also provides a power supply for connection to a three phase input supply, the power supply comprising one or more modules of the form described above. Such a modular power supply design enables supplies covering a wide power range to be implemented and reduces the number of different design variants required to do so. For example, to drive an ultraviolet arc tube, the total power required may vary from 3 kW to 36 kW depending on the tube length and type. In a power supply comprising a plurality of modules, the control for the modules preferably comprises three common control circuits, each controlling the same single phase circuit of each module, thereby minimizing the number of control circuits required. If the power supply is designed for driving a gas discharge lamp, it preferably includes a low frequency inverter connected to the combined output of the one or more modules, such that the inverter generates a low frequency square wave at the power supply output.

BRIEF DESCRIPTION OF THE DRAWINGS

Embodiments of the invention will now be described by way of example and with reference to the accompanying drawings, wherein.

DETAILED DESCRIPTION OF INVENTION

Figure 1:
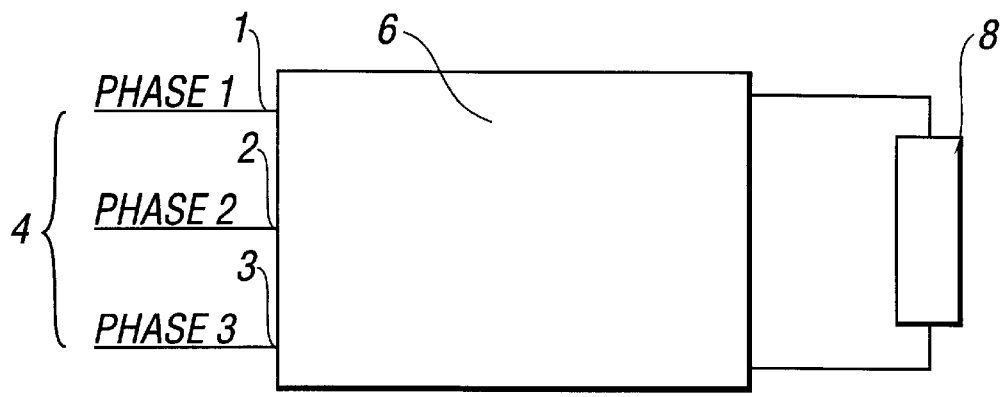
FIG. 1 shows a block diagram of a power supply and discharge lamp.

FIG. 1 illustrates a power supply 6 with a three phase input supply 4. The supply 4 consists of three separate phases 1, 2 and 3. The output of the power supply 6 is connected across a discharge lamp 8.

Figure 2:
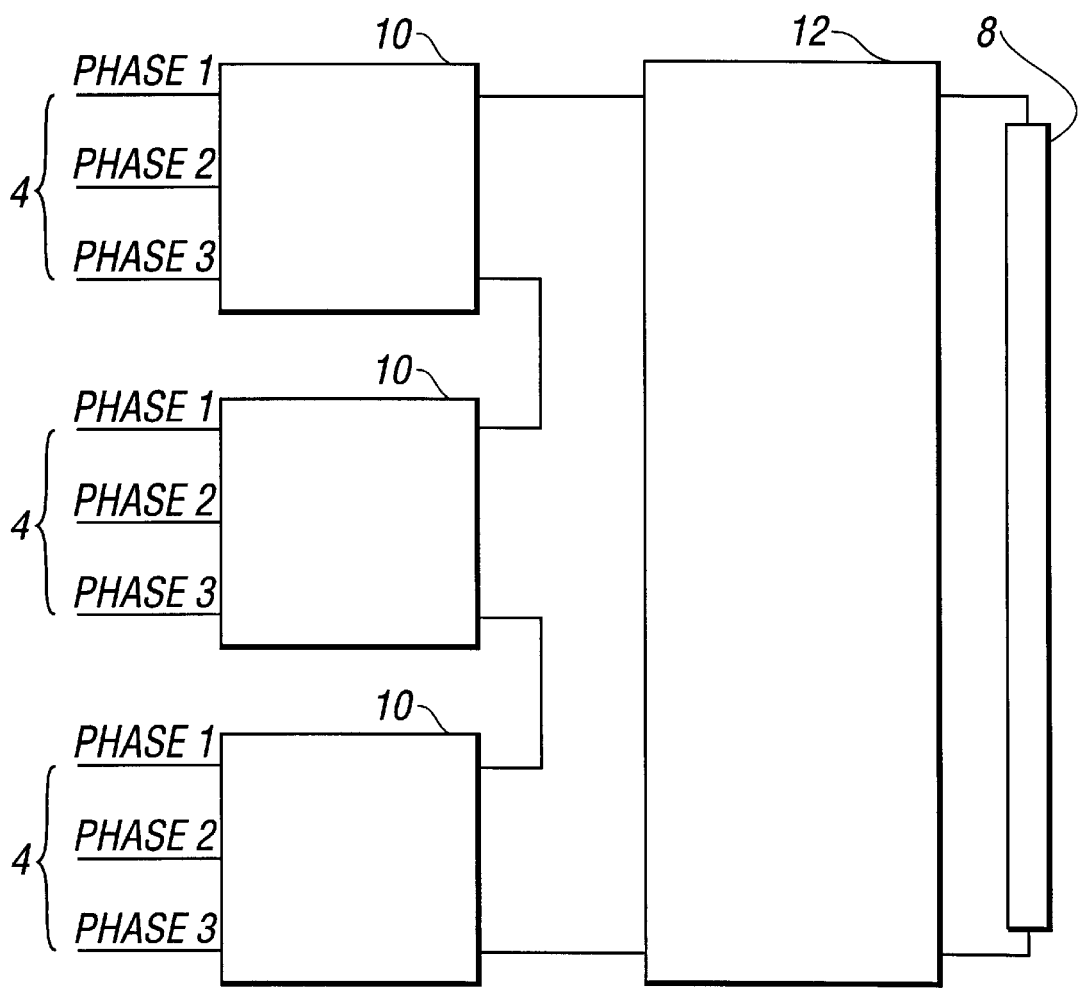
FIG. 2 shows the power supply and lamp of FIG. 1, the power supply being broken down into three modules of the invention, a low frequency inverter and an ignitor.

The power supply shown in FIG. 2 consists of three identical modules 10, and a low frequency inverter and ignitor circuit, 12. Each module may for example be designed to deliver 3.6 kW. The three modules are connected together in series to supply the low frequency inverter and ignitor circuit 12. The inverter circuit is provided to convert the d.c. output of the modules into a low frequency square wave suitable for driving the discharge tube, which may be a UV arc tube for example. Ignition of the tube is achieved by using the ignitor circuit. This may be physically located separately from the power supply, which allows higher ignition voltages to be used and simplifies the wiring required from the power supply to the tube 8. Reduction in the length of cabling between the ignitor and the tube reduces the load on the ignitor circuit and therefore its overall size.

Figure 3:
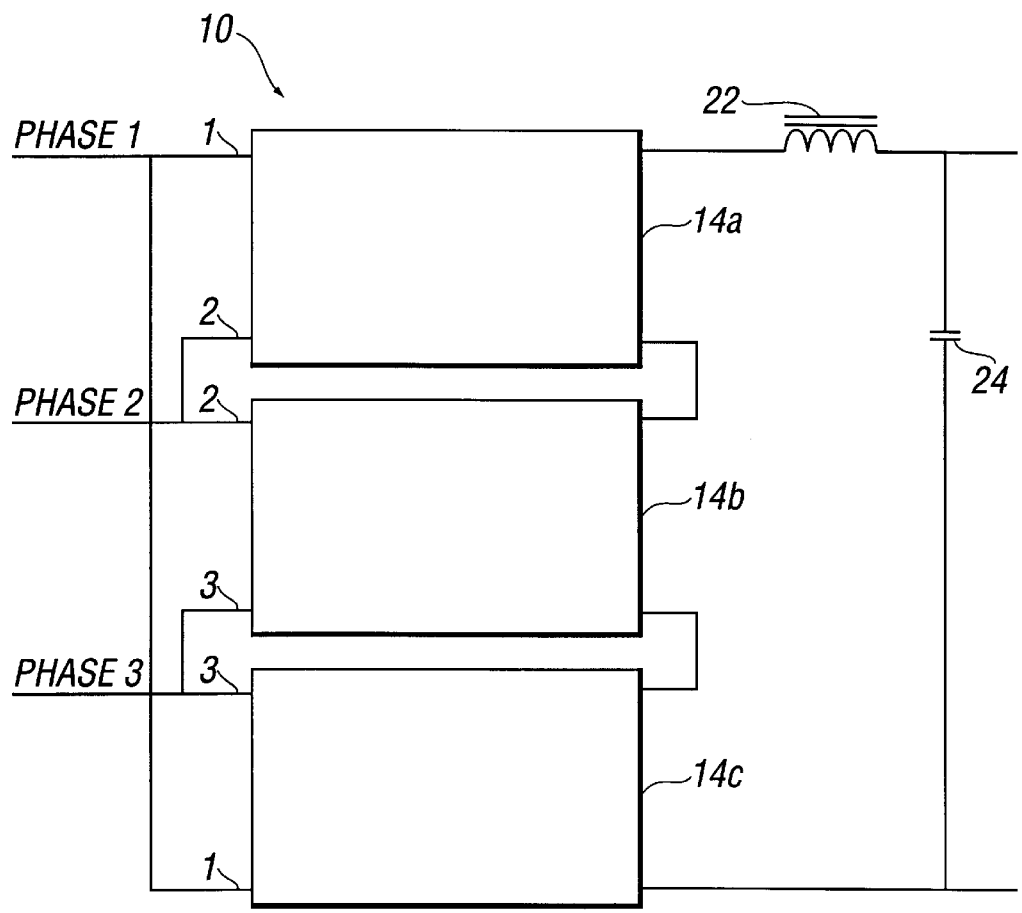
FIG. 3 shows a block diagram of one of the modules shown in FIG. 2.

FIG. 3 shows in greater detail one of the modules 10 of FIG. 2. The module includes three separate circuits 14a to 14c. Circuit 14a is connected between phases 1 and 2 of the input supply, circuit 14b between phases 2 and 3, and circuit 14c between phases 3 and 1. Each circuit draws a sinusoidal current from the supply, substantially in phase with the supply voltage. In FIG. 3, the three circuits 14a to 14c are connected in series to produce the required output. However, depending on the circuit implementation, the outputs could be connected in parallel.

Each circuit 14a to 14c generates a rectified square wave output (see FIG. 4). The configuration of the circuits is discussed in detail below. In FIG. 3, the outputs of the three circuits 14a to 14c are connected in series and filtered by a single output filter for the module. This comprises an inductor 22 connected in series with the module output and a capacitor 24 connected across the output. The inductance of the inductor may, for example, be 1 mH and the capacitance of the capacitor 6 μF. The use of a single output filter is advantageous in that the output filter sees only a small change in duty cycle due to the summation of the three switching waveforms. When the lamp is starting from cold, the duty cycle is held constant for each of the single phase circuits 14, helping to reduce the overall ripple current in the inductor 22. As the lamp temperature increases, the control means of the single phase circuits switches to a phase-shifted duty cycle scheme.

Figure 5:
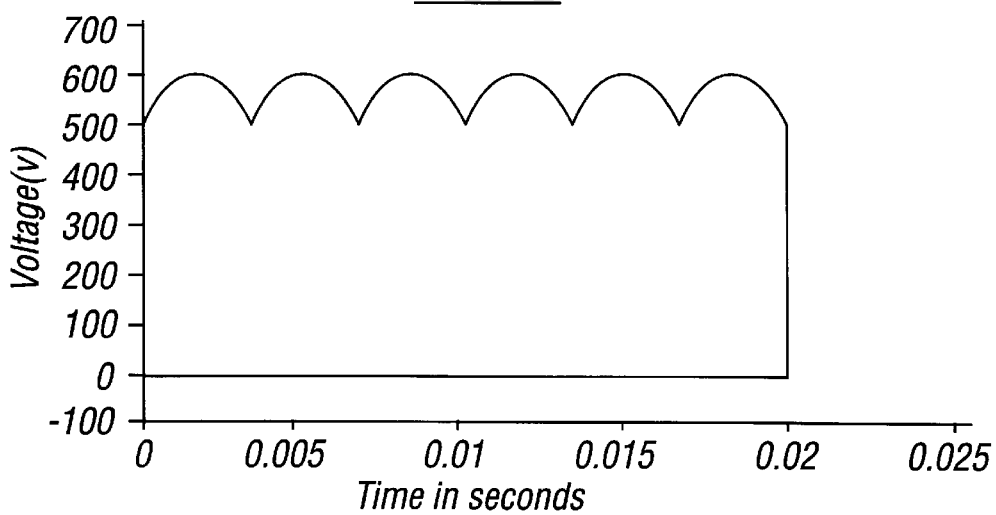
FIG. 5 shows the waveform of FIG. 4d over a 20 ms period.
Figure 4A:
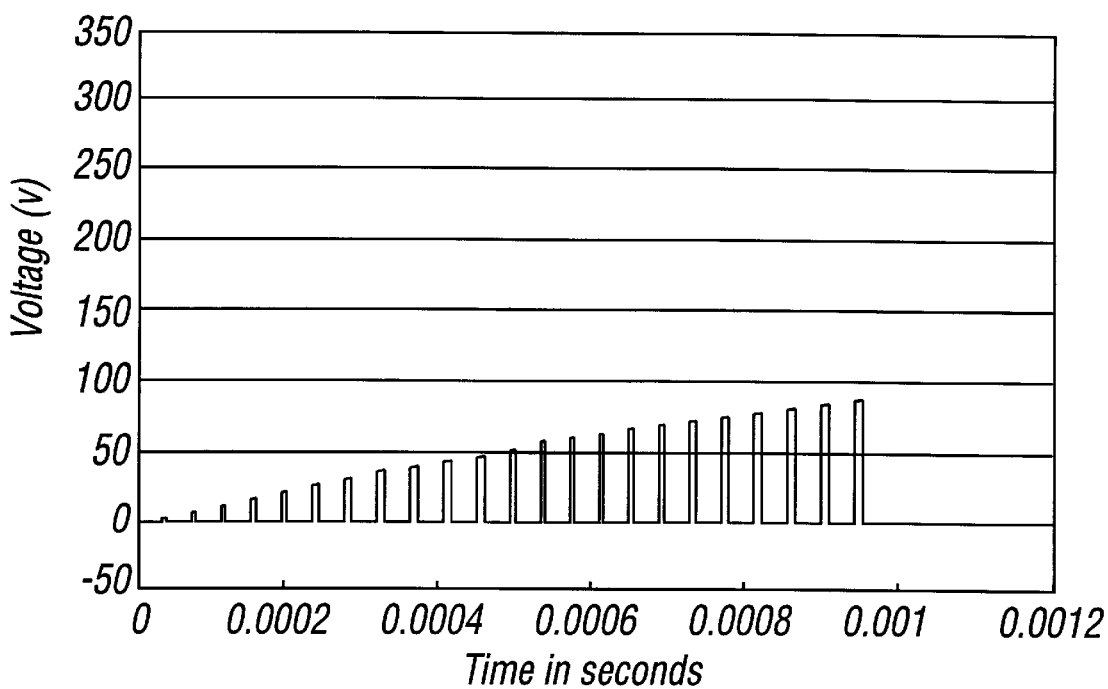
FIGS. 4a–4c show samples of waveforms generated at the outputs of the single phase circuits of FIG. 3, respectively.
Figure 4B:
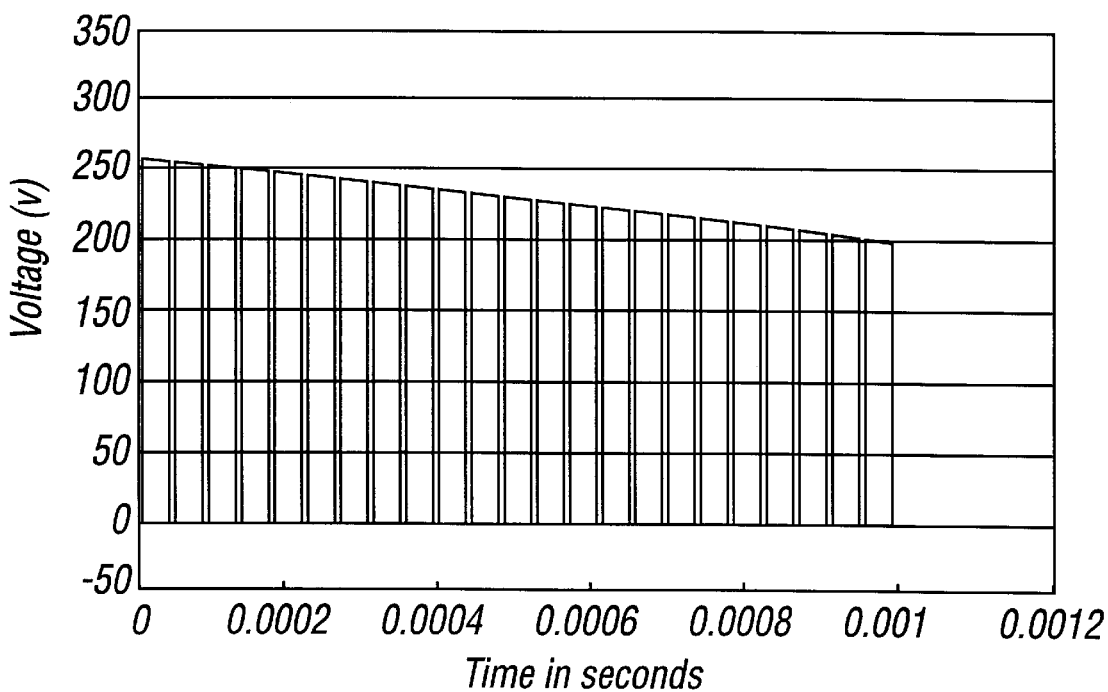
Figure 4C:
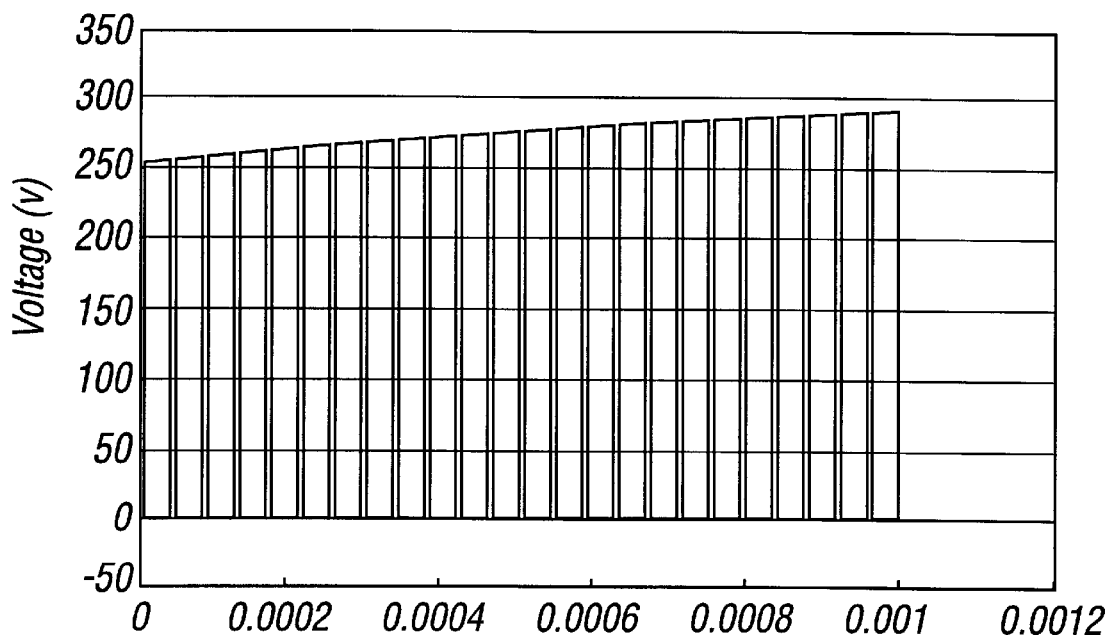
Figure 4D:
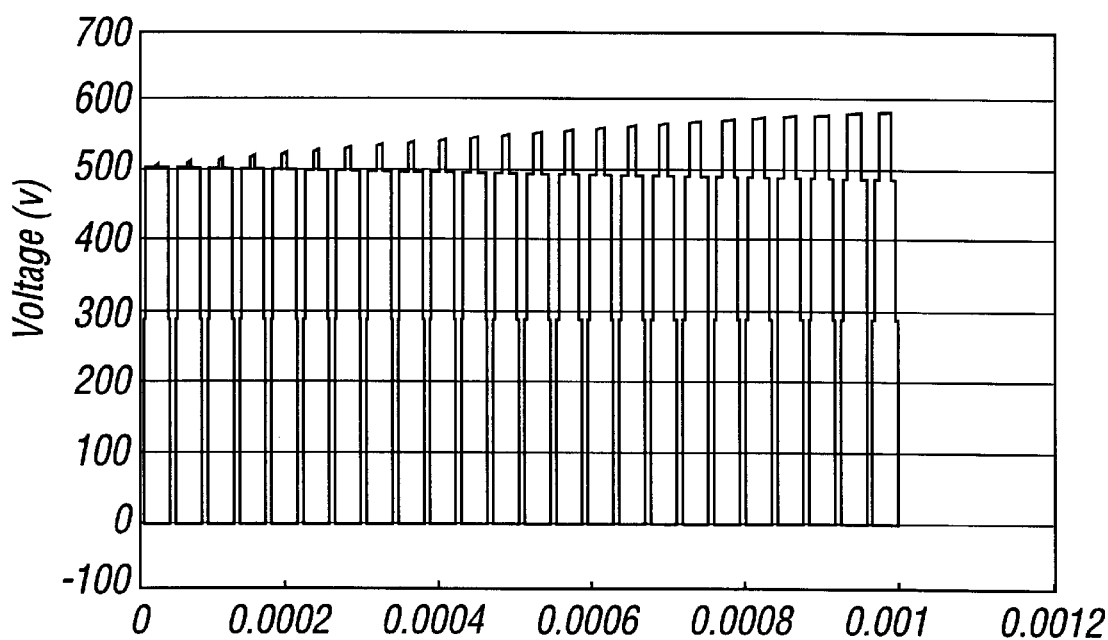
FIG. 4d illustrates a combination of the waveforms of FIGS. 4a–4c, as applied to the output filter of FIG. 3.

FIGS. 4a to 4c illustrate 0.001 s samples of typical output waveforms 16, 18 and 20 generated by the single phase circuits 14a to 14c, respectively. The combination thereof, as applied to the output filter 22, 24 of FIG. 3 is shown in FIG. 4d. This waveform is shown in FIG. 5 over a 20 ms period.

The mathematics behind connecting three single phase circuits 14a to 14c to produce a constant voltage with a constant current load (i.e., constant power) is set out below. Initially, as an introduction, we consider the case that the mains supply is sinusoidal with a peak voltage of $V_p$, and write the peak input current to each converter as $I_p$.

The delta connected power supply comprises three inputs to the respective converters which we will refer to here as Phase A, Phase B and Phase C:

$$A=(2*Pi*F*t) \quad\quad 1$$

$$B=(2*Pi*F*t)+(2*Pi/3) \quad\quad 2$$

$$C=(2*Pi*F*t)+(4*Pi/3) \quad\quad 3$$

Substituting equation 1 into equations 2 and 3:

$$B=A+2*Pi/3 \quad\quad 4$$

$$C=A+4*Pi/3 \quad\quad 5$$

We denote the time-dependent input voltage to the converter which receives phase A as Vain, and similarly the time-dependent input voltages to the other two converters are denoted Vbin and Vcin respectively. Assuming for the moment that Vain is sinusoidal:

$$Vain=Vp*Sin(A) \quad\quad 6$$

For Phase A supply current to meet harmonic requirements:

$$Iain=Ip*Sin(A) \quad\quad 7$$

Phase A power will be $$Pain=Vain*Iain \quad\quad 8$$

Substituting equations 6 and 7 into equation 8 yields:

$$Pain=Vp*Ip*Sin(A) \quad\quad 9$$

Assume lamp current is a constant value denoted here as Il. We denote the power output from the converter for phase A as Paout, and the voltage output from that converter as Vaout. We will denote the corresponding quantities for the other two converters as Pbout and Vbout (for the converter which receives phase B as input) and Pcout and Vcout (for the converter which receives phase C). Then, since the converters are series connected.

$$Paout=Vaout*Il \quad\quad 10$$

Assume for simplicity that for the conversion method that Pin=Pout (i.e 100% efficiency in converting the input power Pin to the set of converters to the output power Pout), that is $$Paout=Pain \quad\quad 11$$

Substituting equation 9 into equation 11 yields:

$$Paout=Vp*Ip*Sin(A) \quad\quad 12$$

Substituting equation 10 into equation 12 and rearranging terms yields:

$$Vaout=Vp*Ip\,Sin^2(A)/Il \quad\quad 13$$

Similarly for Phases B and C $$Vbout=Vp*Ip*Sin^2(B)/Il \quad\quad 14$$

$$Vcout=Vp*Ip*Sin^2(C)/Il \quad\quad 15$$

If the converter circuits are connected in series then total output voltage Vtot is the sum of equations 13, 14 and 15:

$$Vtot=Vaout+Vbout+Vcout \quad\quad 16$$

Substituting equations 13, 14 and 15 yields:

$$Vtot=Vp*Ip*(Sin^2(A)+Sin^2(B)+Sin^2(C))/Il \quad\quad 17$$

Rearranging equation 17 yields:

$$Vtot=(Vp*Ip/Il)*(Sin^2(A)+Sin^2(B)+Sin^2(C)) \quad\quad 18$$

Substituting K=Vp*Ip/Il as a constant yields:

$$Vtot=K*(Sin^2(A)+Sin^2(B)+Sin^2(C)) \quad\quad 19$$

Substituting $2*Sin^2(x)=1-Cos\,2x$ yields $$Vtot=(K/2)*((1-Cos\,2A)+(1-Cos\,2B)+(1-Cos\,2C)) \quad\quad 20$$

Collecting terms yields:

$$Vtot=(3*K/2)-(K/2)*(Cos\,2A+Cos\,2B+Cos\,2C) \quad\quad 21$$

Substituting Z=Cos 2A+Cos 2B+Cos 2C yields:

$$Vtot=(3*K/2)-(K*Z/2) \quad\quad 22$$

Evaluating Z with equations 4 and 5 i.e. B=A+2*Pi/3 and C=A+4*Pi/3

$$Z=Cos\,2A+Cos(2A+4*Pi/3)+Cos(2A+8*Pi/3) \quad\quad 23$$

Noticing that Cos(2A+8*Pi/3) is Cos(2A+2*Pi/3) this yields:

$$Z=Cos\,2A+Cos(2A+2*Pi/3)+Cos(2A+4*Pi/3) \quad\quad 24$$

Substituting Cos(x+y)=Cos(x)*Cos(y)−Sin(x)*Sin(y) yields:

$$Z=Cos\,2A+Cos\,2A*Cos(2*Pi/3)-Sin\,2A*Sin(2*Pi/3)+Cos\,2A*Cos(4*Pi/3)-Sin\,2A*Sin(4*Pi/3). \quad\quad 25$$

Collecting terms yields:

$$Z=Cos\,2A*(1+Cos(2*Pi/3)+Cos(4*Pi/3))-Sin\,2A*(Sin(2*Pi/3)+Sin(4*Pi/3)) \quad\quad 26$$

Evaluating yields:

$$Z=Cos\,2A*(1+(-0.5)+(-0.5))-Sin\,2A*(0.866+(-0.866)) \quad\quad 27$$

$$Z=Cos\,2A*(0)-Sin\,2A*(0) \quad\quad 28$$

$$Z=0 \quad\quad 29$$

From equation 22, Vtot=(3*K/2)−(K*Z/2) and substituting equation 29 yields:

$$Vtot=(3*K/2) \quad\quad 30$$

Substituting for K $$Vtot=(3*Vp*Ip)/(2*Il) \quad\quad 31$$

Equation 31 means that for constant peak input voltage and peak input current with a constant load current the load voltage will be constant.

As noted above, Equation 7 requires that each converter draws fundamental current from the supply which is proportional to the input voltage. This can be achieved by using a forward converter whose duty cycle varies sinusoidally and is synchronized to the mains supply for that converter. This is achieved by the converter being switched, by control of switches internal to them, into a conducting "on" state on the basis of pulsed signals which have a period much lower than the period of the mains (e.g. a period of $4 \times 10^4$ seconds), and which turn the converters "on" for a proportion of the time which, averaged over the pulse period, is linearly dependent on the input voltage to that converter. This "on" period, averaged over any given pulse period, is thus the duty cycle of the converter for that pulse period.

Equation 6 assumes that the incoming mains supply has a sinusoidal characteristic. Normally, however, this will not be the case as there will be distortion applied to the mains supply due to other non-sinusoidal loads. The total output voltage Vtot will then not be constant. Based on practical results the ripple in Vtot can be at least 10% of the total voltage.

For that reason the present invention proposes that compensation is applied to remove the effect of the distortion by measuring the incoming supply voltages Vain, Vbin and Vcin. Internally a sinusoidal reference is generated for all three phases A, B and C. In other words, the duty cycle (proportion of "on" period averaged over the pulse period), may be varied from being purely sinusoidal to compensate for the distortion. This may be done by a measurement of the time since that phase passed zero in relation to the frequency of the mains supply. For example, for phase A this sinusoidal reference is denoted as Sin(Ar) where Ar is defined as tz*freq, tz is the time since the last zero crossing point of phase A and freq is a derived frequency of the mains signal (which in general is derived, not known in advance). Sinusoidal references are similarly, though 10 independently, derived for the other two phases B and C from the zero crossing points of those phases, and denoted respectively as Sin(Br) and Sin(Cr).

With the power supply designed for a minimum peak input voltage Vpmin the expected instantaneous input voltages Vexa, Vexb and Vexc for each of the three phases can be calculated at any instant as follows:

$$Vexa = Vp\text{min} * Sin(Ar) \qquad 32$$

$$Vexb = Vp\text{min} * Sin(Br) \qquad 33$$

$$Vexc = Vp\text{min} * Sin(Cr) \qquad 34$$

Compensation for each individual phase can then be calculated, Compa, Compb, and Compc as follows:

$$Compa = Vexa/Vain \qquad 35$$

$$Compb = Vexb/Vbin \qquad 36$$

$$Compc = Vexa/Vcin \qquad 37$$

Assuming the single phase circuits are forward converters then the duty cycle for each phase Duta, Dutb and Dutc for a sinusoidal input voltage would be as follows:

$$Duta = Sin(Ar) \qquad 38$$

$$Dutb = Sin(Br) \qquad 39$$

$$Dutc = Sin(Cr) \qquad 40$$

More generally, taking into account the need to apply compensations for distortions in the input voltage, the embodiment instead controls the converters using a compensated duty cycle Dutac, Dutbc and Dutcc (i.e. proportion of "on" time) for each respective phase as follows:

$$Dutac = Duta * Compa \qquad 41$$

$$Dutbc = Dutb * Compb \qquad 42$$

$$Dutcc = Dutc * Compc \qquad 43$$

Substituting from equations 32 to 40 results in the following:

$$Dutac = Vp\text{min} * Sin(Ar) * Sin(Ar)/Vain \qquad 44$$

$$Dutbc = Vp\text{min} * Sin(Br) * Sin(Br)/Vbin \qquad 45$$

$$Dutcc = Vp\text{min} * Sin(Cr) * Sin(Cr)/Vcin \qquad 46$$

With the duty cycles compensated as above the corrected output voltages from each three phase circuit Vaoutc, Vboutc, Vcoutc are as follows:

$$Vaoutc = Vain * Dutac \qquad 47$$

$$Vboutc = Vbin * Dutbc \qquad 48$$

$$Vcoutc = Vcin * Dutcc \qquad 49$$

Substituting equations 44 to 46 results in the following:

$$Vaoutc = Vp\text{min} * Sin(Ar) * Sin(Ar) \qquad 50$$

$$Vboutc = Vp\text{min} * Sin(Br) * Sin(Br) \qquad 51$$

$$Vcoutc = Vp\text{min} * Sin(Cr) * Sin(Cr) \qquad 52$$

The embodiment preferably allows for the resetting, by an external control signal, of a control parameter in the range 0 to 1 referred to here as Dutreq. The embodiment uses this parameter to adjust the duty phases of each of the converters by multiplying each of Dutac, Dutbc and Dutcc by the value Dutreq. This has the effect that the output voltage of the module is varied (proportionally to Dutreq) between 0 and the maximum output voltage for the module. Specifically, it produces voltages Vaoutd, Vboutd and Vcoutd as follows:

$$Vaoutd = Vaoutc * Dutreq \qquad 53$$

$$Vboutd = Vboutc * Dutreq \qquad 54$$

$$Vcoutd = Vcoutc * Dutreq \qquad 55$$

Substituting equations 50 to 52

$$Vaoutd = Dutreq * Vp\text{min} * Sin(Ar) * Sin(Ar) \qquad 56$$

$$Vboutd = Dutreq * Vp\text{min} * Sin(Br) * Sin(Ar) \qquad 57$$

$$Vcoutd = Dutreq * Vp\text{min} * Sin(Cr) * Sin(Cr) \qquad 58$$

From equations 13 to 15 and the constant $K = Vp * Ip/\Pi$ $$Vaout = K * Sin(A) * Sin(A) \qquad 59$$

$$Vbout = K * Sin(B) * Sin(B) \qquad 60$$

$$Vcout = K * Sin(C) * Sin(C) \qquad 61$$

Equations 59 to 61 are based on the original premise that the mains supply is sinusoidal, while equations 56 to 58 are based on a non-sinusoidal supply, but using an internally generated sinusoidal reference as explained above.

To be able to equate the equations 56 to 58 with equations 59 to 61, we define a value M by the expression:

$$K = Dutreq * Vpmin * M \qquad 62$$

Since Dutreq, Vpmin and K are all constants then M is also a constant, which represents a fixed scaling factor that would normally be integrated with Dutreq.

Having compensated for the distortion of the incoming mains supply the output will again be a constant. However, as with all power factor controllers that use the supply as part of their reference, there will be distortion in the incoming supply current. This distortion would of course occur with a resistive load and would be considered acceptable by the relevant specifications.

The two solutions presented by the mathematics allow a choice between sinusoidal input current or constant output voltage, if the mains supply is distorted. By restricting the range of compensation allowed, the power factor controller can decide the amount of distortion that can be corrected before ripple voltage will appear in the output. Should the distortion of the mains voltage be excessive the power factor controller can decide not to operate, but instead request that a suitable supply be provided.

This method of compensation is only restricted by the minimum operating voltage required by the single-phase circuits. Indeed it is possible to operate the power factor controller from a three-phase square wave input supply that has a voltage greater than the minimum operating voltage, an absurd situation since it is only necessary to rectify such a supply.

Figure 6:
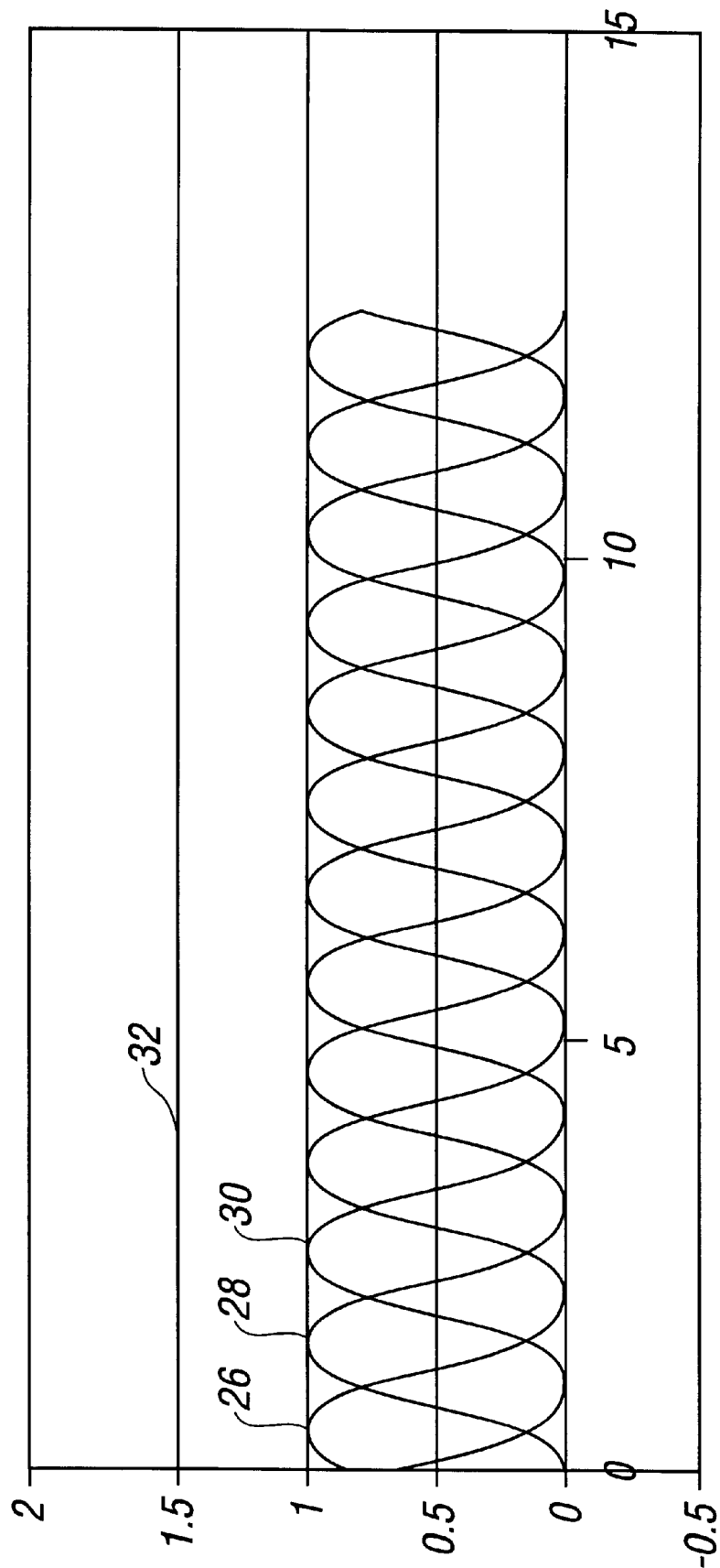
FIG. 6 shows the result of combining three waveforms, each equally out of phase with the other two.

FIG. 6 shows the result of combining three phases 26, 28 and 30, and iteratively evaluating the equations from which equation 31 above was developed. The 1.5 multiplier inherent in equation 31 is exhibited by the combined output 32 shown in FIG. 6. The iteration models the control algorithm required for each circuit 14a to 14c within each module 10. Various modeling techniques have been developed to represent the individual circuits 14a to 14c and the combined outputs of all three to ensure correct operation in practice of the module 10.

Figure 7:
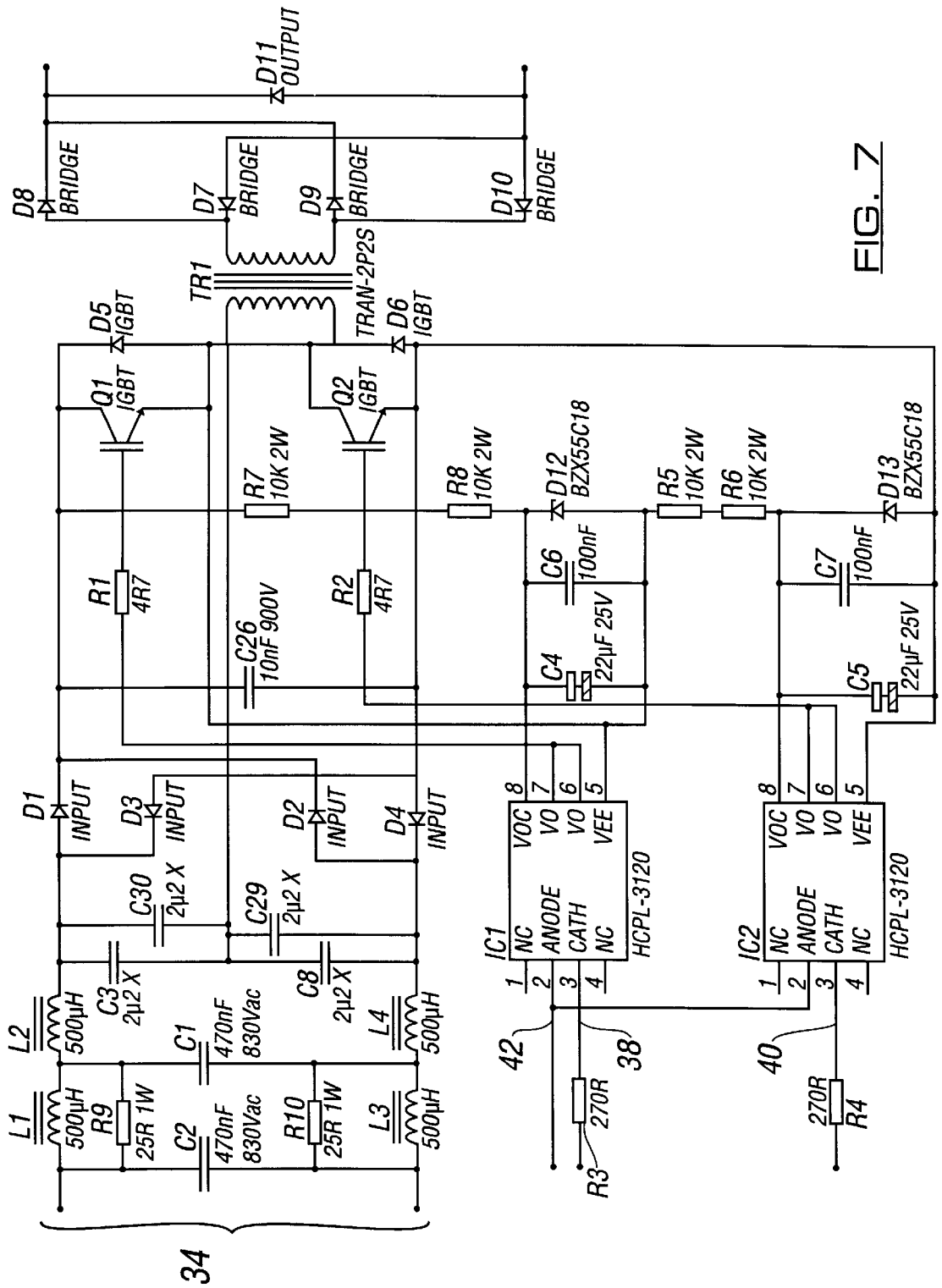
FIG. 7 shows a circuit diagram of a half bridge forward converter for use in a power factor corrector module of the invention.

FIG. 7 shows an implementation of a half bridge forward converter for use in each of the single phase circuits 14. Supply splitting capacitors C3, C8, C29, and C30 are connected across the module input 34. These capacitors are connected across the input of a bridge rectifier consisting of diodes D1 to D4. The output of the bridge rectifier is in turn connected across a half bridge consisting of IGBTs Q1 and Q2. The switching of Q1 and Q2 is controlled by a control 36 (see FIG. 8), which is connected to lines 38 and 40, and supply line 42.

The primary winding of transformer TR1 is connected between the midpoint of IGBTs Q1 and Q2 and that of capacitors C29 and C30. Its secondary winding is connected to the input of an output bridge rectifier consisting of diodes D7 to D10. Diode D11 is connected across the output of the output bridge rectifier.

The converter circuit illustrated in FIG. 7 incorporates several modifications relative to a typical half bridge arrangement. Provision of supply splitting capacitors on the AC side of the bridge rectifier formed by diodes D1 to D4 avoids the bridge rectification having an effect on the input current. The splitting capacitors are also used as part of the EMC filter formed by L1, L2, L3, L4, C1 and C2 for conducted interference. Use of the bridge rectifier formed by D7 to D10 for output rectification improves copper losses in the transformer. Combination of this rectifier with the output diode D11 ensures the secondary of the transformer TR1 does not carry load current during off time. The use of opto-isolated drivers IC1 and IC2 isolates the control circuits from the switching devices. Also, the power supply for the IGBT drivers is developed from the primary side of transformer TR1, by R5 to 8, C4 to 7, D12 and D13, removing the need for floating supplies. This approach is economical, as it avoids the need for individual transformers for the opto-isolated drivers.

Figure 8:
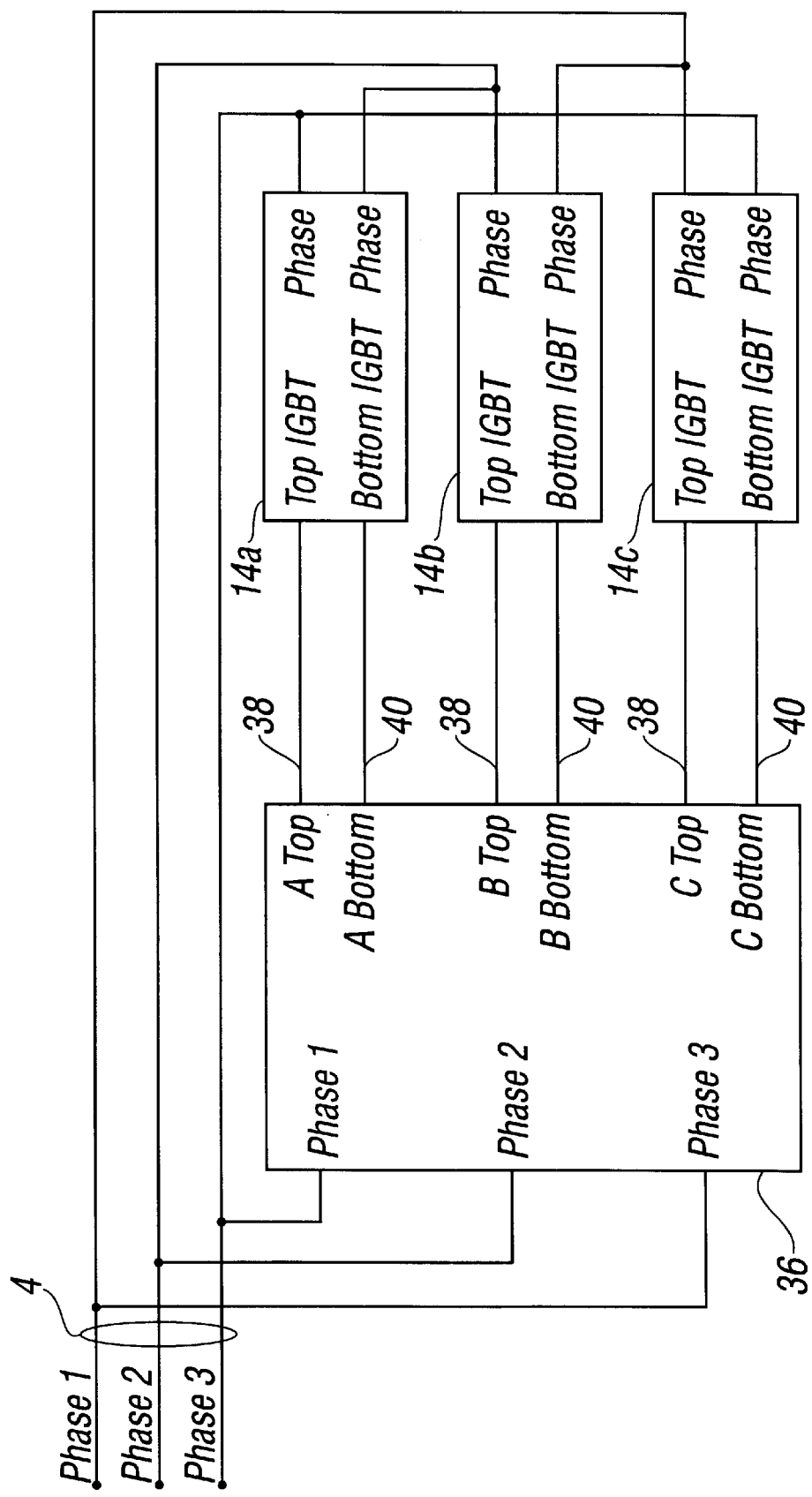
FIG. 8 shows a block diagram representing the interconnection of a control circuit with the single phase circuits.

The interconnection of the control 36 and the three single phase circuits 14a to 14c is shown in FIG. 8. The outputs of the single phase circuits are not shown in this diagram for clarity. The control means preferably comprises a microprocessor with the control algorithms implemented in software. The control algorithms generate the internal sinusoidal signals, which, in combination with measured values for Vain, Vbin and Vcin, are used to generate the three pulsed signals which, when ultimately used to control the switching the transistors (Q1 and Q2) in the three single phase circuits, to provide the desired duty phase for each circuit.

Figure 9:
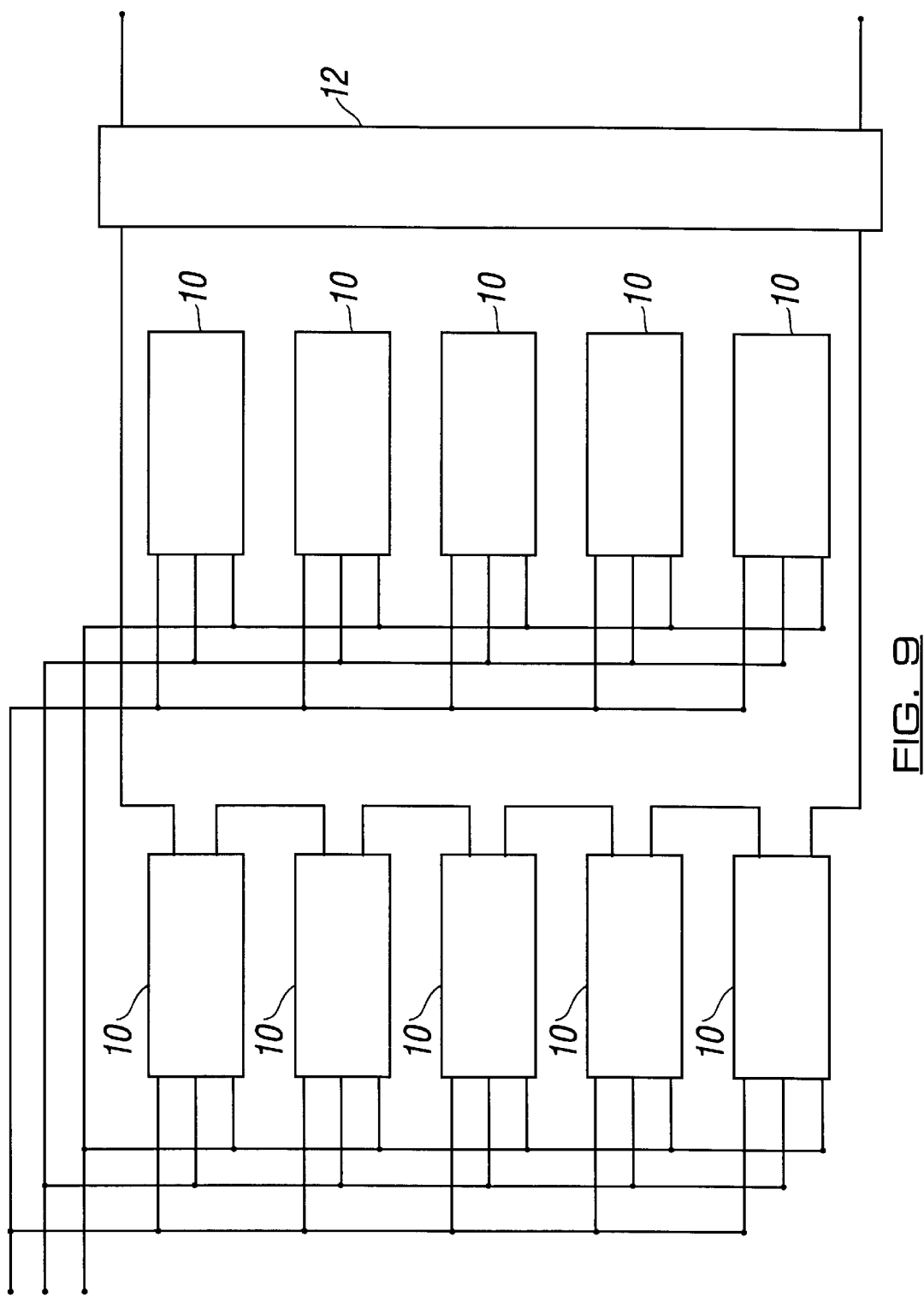
FIG. 9 shows a power supply comprising ten interconnected modules.

FIG. 9 illustrates the interconnection of modules 10 required to produce a 36 kW (2000V 18 A or 1400V 24 A supply) power supply, with the inverter 12 configured as a separate module capable of handling the full voltage and load current. The control logic required to drive the modules 10 may be incorporated within the inverter.

Each single phase circuit 14a to 14c within a module 10 can be driven using a common control means for each particular phase, reducing the number of control means required to three. A separate control means (not shown) is provided for the inverter. The incoming supply voltage is distributed via a bus bar interconnection to the modules 10, and their outputs can be connected using a separate bus bar arrangement or conventional wiring.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims, wherein we claim:

1. A power factor corrector module connectable to a three phase input supply comprising:
   three single phase circuits comprising three converters, each of said single phase circuits having
      a first input adapted to be connected to a phase of the three phase input supply, and
      an output connected in a series circuit with outputs of others of said single phase circuits to provide a total output voltage representing a sum output voltages from said three single phase circuits; and
   a control having three inputs and three outputs, each input adapted to be connected to a different phase of the three phase input supply and each output connected to a second input of one of said three converters, said control circuit operable to vary a duty cycle of each of said three converters using a reference signal synchronized with an input voltage to a respective converter, said reference signal being inversely proportional to a measured instantaneous input voltage to said respective converter.

2. A module according to claim 1 wherein each reference signal is sinusoidal and said control varies the duty cycle of each converter proportionally to the square of a respective sinusoidal reference signal.

3. A module according to claim 1 wherein said control synchronizes each reference signal with the input voltage to a respective converter using the zero crossing points of the input voltage to said respective converter as a reference.

4. A module according to claim 1 wherein said control controls the frequency of each reference signal to be equal to a measured frequency of the input voltage to a respective converter.

5. A module according to claim 1 wherein each of said three converters further comprises a half bridge forward converter.

6. A module according to claim 1 wherein each of said three converters further comprises a transformer and a bridge rectifier to rectify an output of said transformer.

7. A module according to claim 6 wherein a diode is connected across an output of said bridge rectifier.

8. A module according to claim 1 wherein said control varies the duty cycle for each of said converters in response to an external control signal.

9. A module according to claim 1 wherein said control provides a signal indicating an unsuitable voltage from the three phase input supply in response to detecting a duty cycle crossing a predetermined value.

10. A module according to claim 1 wherein each of said three converters further comprises a set of splitting capacitors at the first input of a respective converter, said set of splitting capacitors having an output connected to a diode bridge rectifier, and said diode bridge rectifier having an output connected to switches controlled by said control.

11. A module according to claim 1 further comprising a single output filter connected to said series circuit of outputs of said three converters.

12. A power supply connectable to a three phase input supply comprising:
a plurality of power factor corrector modules adapted to be connected to the three phase input supply, each power factor corrector module comprising
three single phase circuits comprising three converters, each of said single phase circuits having
a first input adapted to be connected to one phase of the three phase input supply, and
an output connected in a series circuit with outputs of others of said single phase circuits to provide a total output voltage representing a sum output voltages from said three single phase circuits; and
a control having three inputs and three outputs, each input adapted to be connected to a different phase of the three phase input supply and each output connected to a second input of one of said three converters, said control circuit operable to vary a duty cycle of each of said three converters using a reference signal synchronized with an input voltage to a respective converter, said reference signal being inversely proportional to a measured instantaneous input voltage to said respective converter.

13. A power supply according to claim 12 wherein said control further comprises three common control circuits, each common control circuit controlling a common single phase circuit of each power factor corrector module.

14. A power supply according to claim 12 wherein said outputs of said three single phase circuits are adapted to be connected to a gas discharge lamp, and the power supply further comprises a low frequency inverter connected to outputs of said plurality of power factor corrector modules, such that said low frequency inverter generates a low frequency square wave at an output of the power supply.

* * * * *

UNITED STATES PATENT AND TRADEMARK OFFICE
CERTIFICATE OF CORRECTION

PATENT NO. : 6,359,799 B2
DATED : March 19, 2002
INVENTOR(S) : Timothy Strand et al.

It is certified that error appears in the above-identified patent and that said Letters Patent is hereby corrected as shown below:

Column 5,
Line 33, change "lain" to -- Iain --.
Line 37, change "lain" to -- Iain --.
Line 40, change "Sin(A)" to -- $Sin^2(A)$ --.
Line 61, change "Sin(A)" to -- $Sin^2(A)$ --.

Column 7,
Line 36, delete "10".

Signed and Sealed this

Twenty-ninth Day of October, 2002

Attest:

JAMES E. ROGAN
Attesting Officer        Director of the United States Patent and Trademark Office